United States Patent
Cornett et al.

(10) Patent No.: US 9,562,973 B2
(45) Date of Patent: Feb. 7, 2017

(54) MULTIMODE DEVICE FOR LOCATING AND IDENTIFYING ITEMS

(71) Applicant: Honeywell International Inc., Morristown, NJ (US)

(72) Inventors: Alan Cornett, Andover, MN (US); Robert Charles Becker, Eden Prairie, MN (US); Doug Carlson, Woodbury, MN (US)

(73) Assignee: Honeywell International Inc., Morris Plains, NJ (US)

( * ) Notice: Subject to any disclaimer, the term of this patent is extended or adjusted under 35 U.S.C. 154(b) by 360 days.

(21) Appl. No.: 14/189,365

(22) Filed: Feb. 25, 2014

(65) Prior Publication Data

US 2014/0240165 A1    Aug. 28, 2014

Related U.S. Application Data

(60) Provisional application No. 61/768,913, filed on Feb. 25, 2013.

(51) Int. Cl.

| G01S 17/74 | (2006.01) |
|---|---|
| G01S 1/70 | (2006.01) |
| G01S 5/02 | (2010.01) |
| G01S 13/78 | (2006.01) |
| G01S 1/04 | (2006.01) |
| G01S 13/76 | (2006.01) |
| G01S 13/75 | (2006.01) |
| G01S 5/16 | (2006.01) |

(52) U.S. Cl.
CPC .............. *G01S 17/74* (2013.01); *G01S 1/70* (2013.01); *G01S 5/0231* (2013.01); *G01S 1/04* (2013.01); *G01S 5/16* (2013.01); *G01S 13/75* (2013.01); *G01S 13/767* (2013.01); *G01S 13/78* (2013.01)

(58) Field of Classification Search
CPC .............. G01S 1/04; G01S 1/70; G01S 17/74; G01S 5/0231; G01S 5/16; G01S 13/75; G01S 13/767; G01S 13/78
USPC ................................................ 342/42, 44, 45
See application file for complete search history.

(56) References Cited

U.S. PATENT DOCUMENTS

| 5,299,227 A * | 3/1994 | Rose | G01S 7/481 340/5.81 |
|---|---|---|---|
| 5,396,243 A * | 3/1995 | Jalink, Jr. | G01S 17/74 342/45 |
| 5,459,470 A * | 10/1995 | Wootton | G01S 17/74 342/45 |
| 5,539,565 A * | 7/1996 | Waddoups | G01S 17/74 342/45 |
| 5,585,953 A * | 12/1996 | Zavrel | H04B 7/00 340/13.22 |
| 5,742,251 A * | 4/1998 | Gerber | F41G 3/2655 342/45 |
| 5,793,630 A * | 8/1998 | Theimer | G01S 5/16 340/10.42 |
| 5,929,777 A * | 7/1999 | Reynolds | G01S 1/70 250/339.14 |

(Continued)

*Primary Examiner* — Peter Bythrow
(74) *Attorney, Agent, or Firm* — Schwegman Lundberg & Woessner, P.A.

(57) ABSTRACT

An integrated identification system including a housing, an active light beacon supported by the housing, an RF beacon supported by the housing, and a controller coupled to the active light beacon and RF beacon to facilitate independent control of the active light beacon and RF beacon.

20 Claims, 2 Drawing Sheets

(56) References Cited

U.S. PATENT DOCUMENTS

| | | | | |
|---|---|---|---|---|
| 5,966,226 | A * | 10/1999 | Gerber | F41G 3/2655 |
| | | | | 342/45 |
| 6,493,123 | B1 * | 12/2002 | Mansell | H04B 10/2587 |
| | | | | 342/45 |
| 7,308,207 | B2 * | 12/2007 | Chen | G01S 7/481 |
| | | | | 342/45 |
| 7,486,189 | B2 * | 2/2009 | Koerner | G01S 1/70 |
| | | | | 340/572.1 |
| 7,573,369 | B2 * | 8/2009 | Hayles, Jr. | G01S 13/78 |
| | | | | 340/10.1 |
| 2004/0027271 | A1 * | 2/2004 | Schuster | H04H 60/45 |
| | | | | 342/42 |
| 2005/0128131 | A1 * | 6/2005 | Rosenberg | G01S 13/78 |
| | | | | 342/45 |
| 2009/0045996 | A1 * | 2/2009 | Ivtsenkov | A61B 5/6814 |
| | | | | 342/45 |
| 2009/0058712 | A1 * | 3/2009 | Roes | F41G 3/2655 |
| | | | | 342/45 |
| 2009/0079616 | A1 * | 3/2009 | Daum | G01S 5/0009 |
| | | | | 342/45 |
| 2012/0268308 | A1 * | 10/2012 | Tuttle | G01S 13/582 |
| | | | | 342/42 |
| 2013/0080049 | A1 * | 3/2013 | Brucker | G01S 5/12 |
| | | | | 701/445 |
| 2014/0085125 | A1 * | 3/2014 | Ivtsenkov | G01S 3/30 |
| | | | | 342/45 |

* cited by examiner

MULTIMODE DEVICE FOR LOCATING AND IDENTIFYING ITEMS

RELATED APPLICATION

This application claims priority to U.S. Provisional Application Ser. No. 61/768,913 (entitled A MULTIMODE DEVICE FOR LOCATING AND IDENTIFYING ITEMS, filed Feb. 25, 2013) which is incorporated herein by reference.

BACKGROUND

In combat operations, it is often difficult to determine friend from foe. Currently, two separate systems are in use: an active IR beacon and a passive IR reflector. The IR beacon is turned on and off at the command of support aircraft in order to prevent unfriendly forces from observing the active IR beacon and cloning it thereby to spoof air support into believing the enemy is part of a friendly force.

The passive IR reflector enables locating personnel that may be incapacitated and unable to respond directly to search and rescue. Unfortunately, if incapacitated personnel are captured and sheltered from observation, it becomes extremely difficult to locate and rescue them.

SUMMARY

An integrated identification system including a housing, an active light beacon supported by the housing, an RF beacon supported by the housing, and a controller coupled to the beacons to facilitate independent control of the active light beacon and RF beacon.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

In combat operations, it is often difficult to determine friend from foe. Currently, two separate systems are in use: an active IR beacon and a passive IR reflector. The current approach to identification is to command friendly troops to activate active IR beacons only when they are under observation and then to turn them off. The passive IR reflector is a separate item typically worn on a sleeve or jacket pocket.

Figure 1:
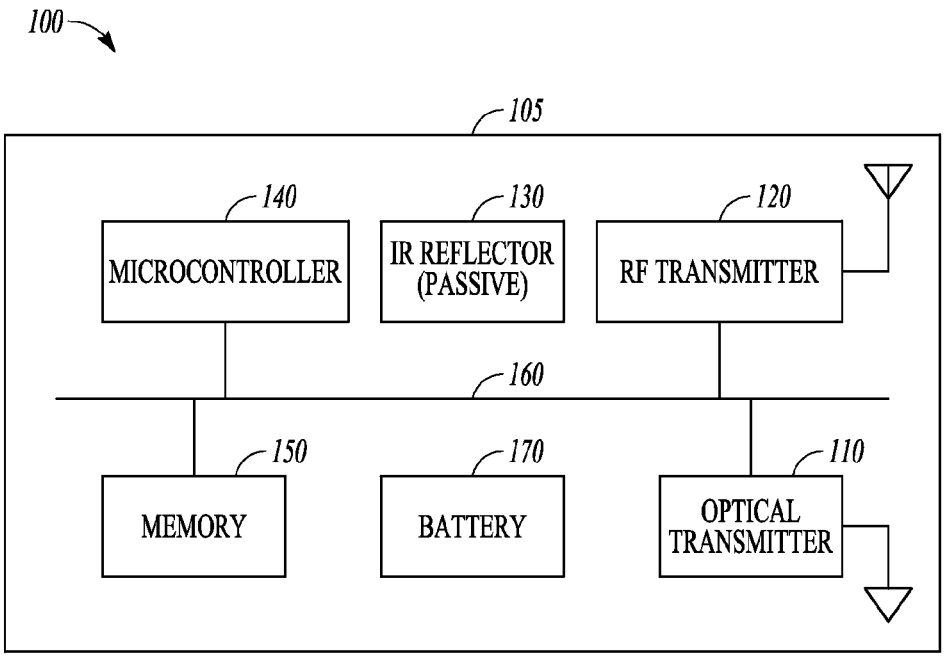
FIG. 1 is a block diagram of an integrated active light beacon and RF beacon system according to an example embodiment.

FIG. 1 is a block diagram of an identification system 100 that includes a housing 105 that includes an example integrated active light beacon 110 and an RF beacon 120. Housing 105 supports a reflector 130 that is highly visible to IR observing equipment when subjected to IR illumination at night and during the day. This is the short range locating and identification equipment.

The low duty cycle RF beacon 120 supported by the housing 105 provides a capability for long distance localization for rescue operations where friendly troops may be held in sheltered areas or when troop location is not well known. In one embodiment, the RF beacon 120 comprises a low duty cycle RF beacon. The RF beacon 120 and active IR beacon 110 are integrated into a single package, referred to as housing 105, at least partially covered by the IR selective reflector represented as a block for convenience at 130.

The IR beacon 110 and RF beacon 120 may be individually activated and de-activated via a controller 140. The controller 140 may include an RF receiver in one embodiment to receive commands from support and search vehicles to turn on and off different components of the identification system 100 depending on operations being conducted. The RF beacon 120 may include an RF transceiver to receive such commands and provide them to the controller 140.

In some embodiments, the IR beacon may be used during combat operations to identify friend or foe, while search and rescue operations may turn on the RF beacon. In further embodiments, both beacons may be used for identification. Generally, the IR beacon is used for shorter range identification, and the RF beacon is used for longer range identification.

A memory device 150 may be coupled to the controller 140 via a bus 160. Bus 160 may also be used by the controller to control the beacons 110, 120, which are also coupled to the bus 160. A battery 170 may be provided to power components of the identification system 100, such as the controller 140, memory 150, RF beacon 120 comprising an RF transmitter, and the optical beacon 110 comprising an optical transmitter.

In one embodiment, the IR and RF beacons may be controlled via controller 140 that is either hardwired or executing a program stored in memory 150 to emit coded pulses that may be used to uniquely identify individuals or groups. The coded pulses may be stored in the memory 150 in one embodiment. This capability forms a compact, low power identification system 100 for combat troops.

The combination may be constructed from a low profile, programmable radio frequency beacon. The RF beacon 120 transmits at a very low duty cycle to maximize battery life and the RF transmission can be coded to identify an item uniquely or the RF can be coded to identify a group or category of items. This forms the long distance localization device.

The optical beacon 110 in the same package or housing 105 emits pulses of light. The light pulses can be coded to uniquely identify an item or group of items or people. A set of light pulses that identify a bearer of the identification system 100 may be referred to as a coded pulse. The light pulse can be visible or infrared. Such light pulses form part of the short range identification and localization function.

The last item is the IR selective reflector 130 that may be applied to one or more faces of the housing 105 that incorporate the two identification and localization devices. The IR selective reflector 130 is a passive system may be used to detect the presence of items or personnel in the event that the RF and optical beacons become inoperable due to battery depletion.

Various coding schemes, including coding schemes utilized by prior art RF beacons and optical beacons may be used for the beacons and may be the same or different for each type of beacon. In one embodiment, the code may be a Morse code like representation of a unique ID for each person consisting of alphanumeric characters. The ID in some embodiments may be a name, social security number, other identifying number, or a combination thereof. In further embodiments, coding may be variable or uniform length short pulses and may be variably spaced within a known time period, and transmitted periodically, such as every 10 seconds, minute, or hour. The time between transmissions, the periodicity, may be extended as battery life decreases to extend the number of hours, days, or weeks that the ID may be transmitted.

Figure 2:
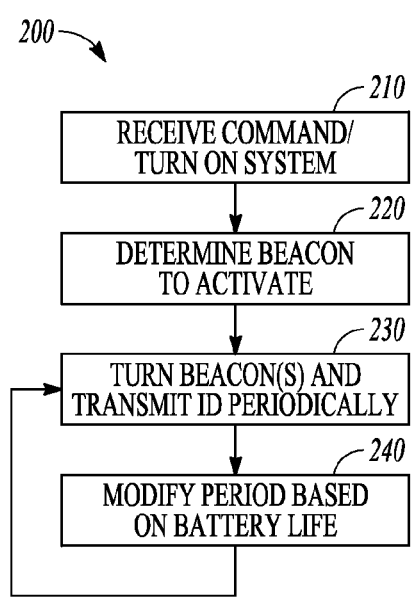
FIG. 2 is a flowchart illustrating a method of independently controlling beacons according to an example embodiment.

FIG. 2 is a flowchart illustration of a method 200 of operation of operation of an identification system. At 210, the identification system is activated by receiving an RF signal having a command from a remote vehicle or person, or by a wearer of the identification system pressing a button or otherwise activating the identification system. At 220, the command is interpreted by the controller to determine which beacons to actuate. At 230, one or more of the beacons are turned on, and transmit an identification signal periodically. Optionally, at 240, the battery utilization is sensed or calculated and the period of the transmission at 230 may be varied to extend the battery life.

Figure 3:
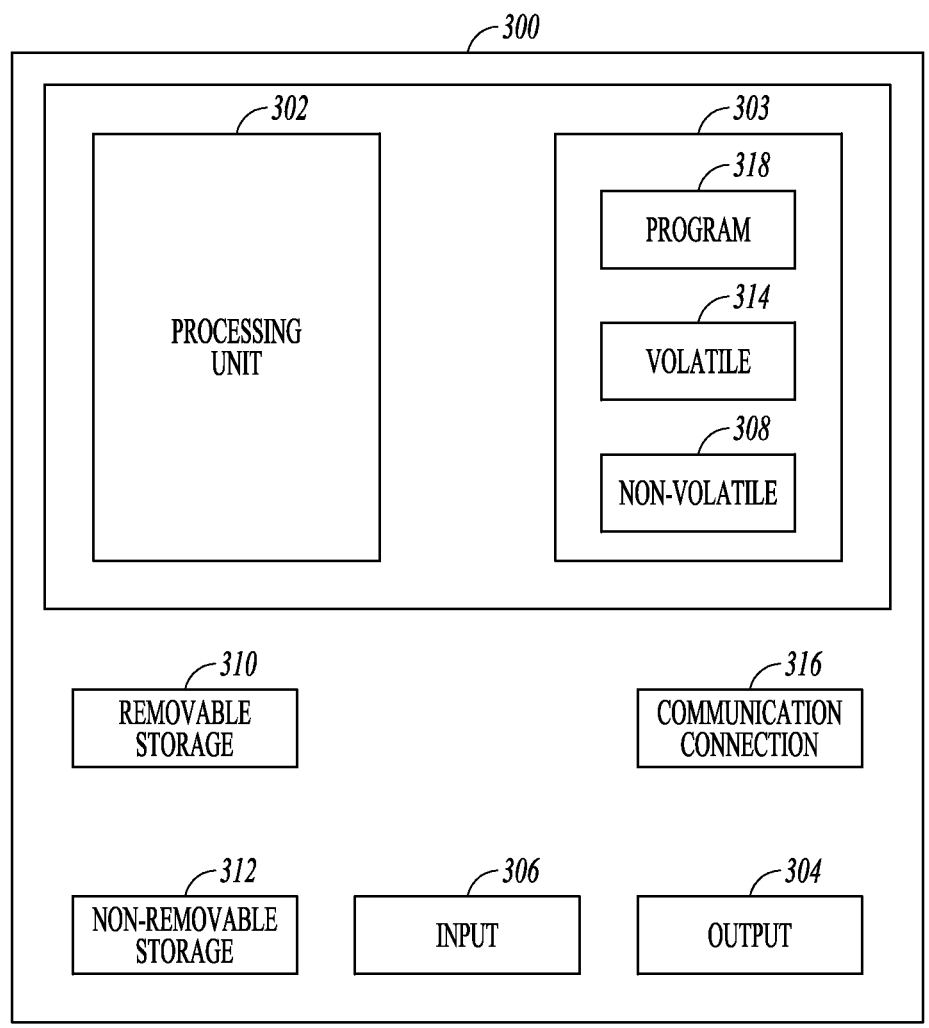
FIG. 3 is a block diagram of a control system according to an example embodiment.

FIG. 3 is a block schematic diagram of a computer system 300 to implement a micro-controller according to an example embodiment. In one embodiment, multiple such computer systems are utilized in a distributed network to implement multiple components in a transaction based environment. One example computing device in the form of a computer 300, may include a processing unit 302, memory 303, removable storage 310, and non-removable storage 312. Memory 303 may include volatile memory 314 and non-volatile memory 308. Computer 300 may include—or have access to a computing environment that includes—a variety of computer-readable media, such as volatile memory 314 and non-volatile memory 308, removable storage 310 and non-removable storage 312. Computer storage includes random access memory (RAM), read only memory (ROM), erasable programmable read-only memory (EPROM) & electrically erasable programmable read-only memory (EEPROM), flash memory or other memory technologies devices, or any other medium capable of storing computer-readable instructions. Computer 300 may include or have access to a computing environment that includes input 306, output 304, and a communication connection 316.

Computer-readable instructions stored on a computer-readable medium are executable by the processing unit 302 of the computer 300. Flash memory or other non-volatile memory are examples of non-transitory computer readable media. The computer-readable instructions allow computer 300 to perform functions such as controlling the operating the IR beacon and RF beacons and also can supervise modification of the instructions stored in the computer readable medium.

EXAMPLES

1. An identification system comprising:
a housing;
an active light beacon supported by the housing;
an RF beacon supported by the housing; and
a controller coupled to the active light beacon and RF beacon to activate either or both of the active light beacon and RF beacon.

2. The identification system of claim 1 and further comprising an IR reflector supported by a face of the housing.

3. The identification system of example 1 and further comprising an IR reflector disposed on an outside surface of the housing.

4. The identification system of example 1 and further comprising a battery coupled to power the beacons, wherein the RF beacon operates at a low duty cycle to conserve battery life.

5. The identification system of example 1 wherein the RF beacon transmits a coded RF signal.

6. The identification system of example 5 wherein the coded RF signal is coded to uniquely identify an item or person.

7. The identification system of example 1 wherein the active light beacon emits an IR pulse of light that is coded.

8. The identification system of example 1 and further comprising a controller to receive external commands.

9. The identification system of claim 8 wherein the controller is adapted to turn on either or both beacons responsive to the commands.

10. The identification system of claim 8 and further comprising a battery to power the controller and the beacons and wherein the controller controls the activated beacon or beacons to periodically transmit identification signals and lengthens a period between transmissions based on remaining battery life.

11. An identification system comprising:
a housing;
a passive IR reflector positioned on at least one outside surface of the housing;
an active light beacon supported by the housing;
an RF beacon supported by the housing;
a controller coupled to control the active light beacon and the RF beacon;
an RF receiver coupled to receive transmitted commands and provide the commands to the controller; and
wherein the controller is configured to activate the active light beacon and RF beacon responsive to the commands.

12. The identification system of example 11 and further comprising a memory device coupled to the controller and having controller executable instructions to cause the controller to activate the active light beacon and RF beacon responsive to the commands.

13. The identification system of example 12 and further comprising a battery coupled to power the beacons, wherein the RF beacon operates at a low duty cycle to conserve battery life.

14. The identification system of example 12 wherein the RF beacon transmits a coded RF signal.

15. The identification system of example 14 wherein the coded RF signal is coded to uniquely identify an item or person.

16. The identification system of example 12 wherein the active light beacon emits an IR pulse of light that is coded.

17. The identification system of example 12 wherein the controller is configured to turn on either or both beacons responsive to the commands.

18. The identification system of example 12 and further comprising a battery to power the controller and the beacons and wherein the controller controls the activated beacon or beacons to periodically transmit identification signals and lengthens a period between transmissions based on remaining battery life.

19. A method comprising:
  receiving a command via an RF receiver to turn on a beacon;
  determining which beacon to turn on from an RF beacon and an active light beacon integrated into an identification device;
  turning on the determined beacon; and
  periodically transmitting a coded pulse identifying a person wearing the identification device.

20. The method of claim 19 and further comprising reflecting IR signals impinging on the identification device via an IR reflector disposed on an outside surface of the identification device.

21. An integrated identification system comprising:
  a housing;
  an active light beacon supported by the housing;
  an RF beacon supported by the housing; and
  a controller coupled to the active light beacon and RF beacon to facilitate independent control of the active light beacon and RF beacon.

22. The integrated identification system of example 21 and further comprising an IR reflector supported by the housing.

23. The integrated identification system of example 21 and further comprising an IR reflector disposed on an outside surface of the housing.

24. The integrated identification system of example 21 wherein the RF beacon includes a battery and operates at a low duty cycle to conserve battery life.

25. The integrated identification system of example 21 wherein the RF beacon transmits a coded RF signal.

26. The integrated identification system of example 25 wherein the coded RF signal is coded to uniquely identify an item or person.

27. The integrated identification system of example 21 wherein the active light beacon emits an IR pulse of light that is coded.

The invention claimed is:

1. An integrated identification system comprising:
  a housing;
  an active light beacon supported by the housing;
  an RF beacon, including an RF receiver, supported by the housing; and
  a controller coupled to the active light beacon and RF beacon to facilitate independent control of the active light beacon and RF beacon responsive to receipt of an RF command by the RE receiver.

2. The integrated identification system of claim 1 and further comprising an IR reflector supported by the housing.

3. The integrated identification system of claim 1 and further comprising an IR reflector disposed on an outside surface of the housing.

4. The integrated identification system of claim 1 wherein the RF beacon includes a battery and varies a duty cycle to conserve battery life.

5. The integrated identification system of claim 1 wherein the RF beacon transmits a coded RE signal.

6. The integrated identification system of claim 5 wherein coded RF signal is coded to uniquely identify an item or person.

7. The integrated identification system of claim 1 wherein the active light beacon emits an IR pulse of light that is coded.

8. The identification system of example 1 and further comprising a controller to receive external commands.

9. The identification system of claim 8 wherein the controller is adapted to turn on either or both beacons responsive to the commands.

10. The identification system of claim 8 and further comprising a battery to power the controller and the beacons and wherein the controller controls the activated beacon or beacons to periodically transmit identification signals and lengthens a period between transmissions based on remaining battery life.

11. An identification system comprising:
  a housing;
  a passive IR reflector positioned on at least one outside surface of the housing;
  an active light beacon supported by the housing;
  an RF beacon supported by the housing;
  a controller coupled to control the active light beacon and the RF beacon;
  an RF receiver coupled to receive transmitted commands and provide the commands to the controller; and
  wherein the controller is configured to independently activate the active light beacon and RF beacon responsive to the commands.

12. The identification system of example 11 and further comprising a memory device coupled to the controller and having controller executable instructions to cause the controller to activate the active light beacon and RF beacon responsive to the commands.

13. The identification system of example 12 and further comprising a battery coupled to power the beacons, wherein the RF beacon varies a duty cycle to conserve battery life.

14. The identification system of example 12 wherein the RE beacon transmits a coded RE signal.

15. The identification system of example 14 wherein the coded RE signal is coded to uniquely identify an item or person.

16. The identification system of example 12 wherein the active light beacon emits an IR pulse of light that is coded.

17. The identification system of example 12 wherein the controller is configured to turn on either or both beacons responsive to the commands.

18. The identification system of example 12 and further comprising a battery to power the controller and the beacons and wherein the controller controls the activated beacon or beacons to periodically transmit identification signals and lengthens a period between transmissions based on remaining battery life.

19. A method comprising:
  receiving a command via an RE receiver to turn on a beacon;
  determining which beacon to turn on from an RE beacon and an active light beacon integrated into an identification device;
  turning on the determined beacon; and
  periodically transmitting a coded pulse identifying a person wearing the identification device.

20. The method of claim 19 and further comprising reflecting IR signals impinging on the identification device via an IR reflector disposed on an outside surface of the identification device.

* * * * *